(12) United States Patent
Li et al.

(10) Patent No.: US 7,079,991 B2
(45) Date of Patent: Jul. 18, 2006

(54) MANEUVERING TARGET TRACKING METHOD VIA MODIFYING THE INTERACTING MULTIPLE MODEL (IMM) AND THE INTERACTING ACCELERATION COMPENSATION (IAC) ALGORITHMS

(75) Inventors: Luo Wen Li, Singapore (SG); Chian Poh Lam, Singapore (SG)

(73) Assignee: Singapore Technologies Aerospace Ltd., Singapore (SG)

(*) Notice: Subject to any disclaimer, the term of this patent is extended or adjusted under 35 U.S.C. 154(b) by 684 days.

(21) Appl. No.: 10/127,170

(22) Filed: Apr. 22, 2002

(65) Prior Publication Data
US 2003/0200065 A1 Oct. 23, 2003

(30) Foreign Application Priority Data
Apr. 20, 2001 (SG) ............................. 200102213-6

(51) Int. Cl.
*G06F 17/10* (2006.01)
(52) U.S. Cl. ............................. 703/2; 342/95; 342/161
(58) Field of Classification Search .................... 703/2; 342/95, 96, 101, 195
See application file for complete search history.

(56) References Cited

U.S. PATENT DOCUMENTS 5,214,433 A * 5/1993 Alouani et al. ............... 342/95
5,325,098 A * 6/1994 Blair et al. .................... 342/95
5,537,118 A * 7/1996 Appriou ....................... 342/95

OTHER PUBLICATIONS

Efe, Murat; Atherton, Derek P.; "Maneuvering Target Tracking With an Adaptive Kalman Filter", Dec. 1998, Proceedings of the 37th IEEE Conference on Decision & Control.*
Gutman, Per-Olof; Velger, Mordekhai; "Tracking Targets Using Adaptive Kalman Filtering", Sep. 1990, IEEE Transactions on Aerospace and Electronic Systems, vol. 26, No. 5.*
Tenney, Robert R.; Hebbert, Ralph S.; Sandell, Nils R.; "A Tracking Filter for Maneuvering Sources", Apr. 1977, IEEE Transactions on Automatic Control, vol. 22, No. 2.*
Munir, A.; Atherton, D. P.; "Adaptive interacting multiple model algorithm for tracking a manoevring target", Feb. 1995, IEE Proceedings—Radar, Sonar, Navigation, vol. 142, No. 1.*
Layne, Jeffery R.; Piyasena, Uditha C.; "adaptive interacting multiple model tracking of maneuvering targets", 16th Digital Avionics Systems Conference, 1997, vol. 1, Oct. 26-30, 1997.*

(Continued)

*Primary Examiner*—Paul L. Rodriguez
*Assistant Examiner*—Russ Guill
(74) *Attorney, Agent, or Firm*—Saile Ackerman LLC; Stephen B. Ackerman

(57) ABSTRACT

The present invention relates to the field of target tracking and more generally to a method employing improved algorithms, which achieve excellent tracking performance for a high-g maneuvering target. The two-model Interacting Multiple Model algorithm and the Interacting Acceleration Compensation algorithm will be modified by introducing adaptive factors through the detection of the normalized innovation squared which is chi-square probability distributed. The implementation results show that the modified algorithms can handle the target sudden maneuver better and are more accurate than the original algorithms.

6 Claims, 7 Drawing Sheets

OTHER PUBLICATIONS

Farooq, M.; Bruder, S.; "Information Type Filters for Tracking a Maneuvering Target", May 1990, IEEE Transactions on Aerospace and Electronic Systems, vol. 26, No. 3.*

Mazor, E.; Averbuch, A.; Bar-Shalom Y.; Dayan, J.; "Interacting Multiple Model Methods in Target Tracking: A Survey", Jan. 1998, IEEE Transactions on Aerospace and Electronic Systems, vol. 34, No. 1.*

Bekir, E.; The abstract of "Adaptive Kalman filter for tracking maneuvering targets", 1983, Journal of Guidance, Control, and Dynamics, vol. 6, Sep.-Oct. 1983.*

Johnston, Leigh A.; Krishnamurthy, Vikram; "An Improvement to the Interacting Multiple Model (IMM) Algorithm", Dec. 2001, IEEE Tranactions on Signal Processing, vol. 49, No. 12.*

Mehra, Raman K.; "On the Identification of Variances and Adaptive Kalman Filtering", Apr. 1970, IEEE Transactions on Automatic Control, vol. AC-15, No. 2.*

"Interacting Acceleration Compensation Algorithm for Tracking Maneuvering Targets," by Watson & Blair, IEEE Trans. on Aerospace and Electronic Sys., vol. 31, No. 2, Jul. 1995, pp. 1152-1159.

"Multitarget-Multisensor Tracking: Principles and Techniques," Norwood, MA: Artech House, 1995, by Y. Bar-Shalom and X.R. Li, 1.7-1.75.

Efe, et al., "Maneuvering Target Tracking With an Adaptive Kalman Filter", Dec. 1998, Proceedings of the 37th IEEE Conf. on Decision & Control, pp. 737-742.

Gutman et al; "Tracking Targets Using Adaptive Kalman Filtering", Sep. 1990, IEEE Trans. on Aerospace and Elec. Systems, vol. 26, No. 5, pp. 691-699.

Tenney et al., "A Tracking Filter for Maneuvering Sources", Apr. 1977, IEEE Trans. on Automatic Control, vol. 22, No. 2 pp. 246-251.

Munir et al., "Adaptive Interacting Multiple Model Algorithm for Tracking a Manoeuvring Target", Feb. 1995, IEE Proc.-Radar, Sonar, Navigation, vol. 142, No. 1, pp. 11-17.

Layne, et al., "Adaptive Interacting Multiple Model Tracking of Maneuvering Targets", 16th Digital Avionics Sys. Conf., 1997, vol. 1, Oct. 26-30, 1997, pp. 5.3-16 to 5.3-23.

Farooq et al., "Information Type Filters for Tracking a Maneuvering Target", May 1990, IEEE Trans. on Aerospace and Elec. Systems, vol. 26, No. 3, pp. 441-454.

Mazor et al., "Interacting Multiple Model Methods in Target Tracking : A Survey", Jan. 1998, IEEE Trans. on Aerospace and Elec. Systems, vol. 34, No. 1, pp. 103-123.

Bekir, E., *The abstract of* "Adaptive Kalman Fiter for Tracking Maneuvering Targets", 1983, Journal of Guidance, Control, and Dynamics, vol. 6, Sep.-Oct. 1983.

Johnston, et al., "An Improvement to the Interacting Multiple Model (IMM) Algorithm", Dec. 2001, IEEE Trans. on Signal Processing, vol. 49, No. 12, pp. 2909-2923.

Mehra, Raman K.," On the Identification of Variances and Adaptive Kalman Filtering", Apr. 1970, IEEE Trans. on Auto. Control, vol. AC-15, No. 2, pp. 175-184.

* cited by examiner

Target Trajectory of Scenerio 1

Target Trajectory of Scenerio 2

MANEUVERING TARGET TRACKING METHOD VIA MODIFYING THE INTERACTING MULTIPLE MODEL (IMM) AND THE INTERACTING ACCELERATION COMPENSATION (IAC) ALGORITHMS

BACKGROUND OF THE INVENTION (a) Technical Field of the Invention

The present invention relates to the field of target tracking and more generally to a method employing improved algorithms, which achieve excellent tracking performance for a high-g maneuvering target.

(b) Description of the Prior Art

Target tracking is a critical component in multi-platform Multi-sensor Data Fusion(MSDF) for tactical situation awareness of the dynamic battlefield and for threat assessment. For most airborne fire control radar in fighters, the simple Kalman filter is widely used as the target tracking technique. However target maneuvers are highly unpredictable and can range from 2 g to more than 9 g. The Kalman filter will have to compromise between accuracy and track loss. Both of which are detrimental to weapon engagement.

The Kalman filter is the conventional and most widely used state estimator for providing optimal tracking performance based on the critical assumption that a single state model is required. In the practical multi-target tracking scenario, the targets being tracked will at times undergo maneuvers. which cannot be modeled well for the Kalman filter. To achieve superior performance while tracking maneuvering targets, it is necessary that the estimator allows for the motion of a target to be described by different models with different state equations in different time intervals. A hybrid system can match the above target model well and systems with Markovian switching parameters are typical examples of the hybrid systems. This has been disclosed in "MULTITARGET-MULTISENSORS TRACKING: PRINCIPLES AND TECHNIQUES", Norwood, Mass.: Artech House, 1995, by Y. Bar-Shalom and X. R. Li.

However, the estimator for hybrid systems has exponentially increasing complexity. The optimal approach to estimate the target state requires that every possible model sequence from the initial through the most recent observation to be considered. Thus for M models and N observations, there are $M^N$ hypotheses to consider. This is not practical and hence efficient management of the multiple hypotheses is critical to limiting computational requirements while maintaining performance. Many techniques such as generalized pseudo Bayesian algorithm (e.g. GPB1 and GPB2) have been employed to reduce the number of hypotheses and most search in the literature indicate that the two model IMM algorithm is the preferred technique for real-time tracking of maneuvering targets, considering the performance and computational requirements. With the IMM estimator, an explicit provision is made for the target motion to automatically "switch" from one motion model to another in a probabilistic manner, thereby achieving adaptive bandwidth adjustment required by a maneuvering target tracking filter.

Compared with IMM algorithm, another effective maneuvering target track algorithm, the Interacting Acceleration Compensation algorithm, was proposed by Watson and Blair in "INTERACTING ACCELERATION COMPENSATION ALGORITHM FOR TRACKING MANEUVERING TARGETS", IEEE Transactions on Aerospace and Electronic Systems, Vol. 31, No. 2, Jul. 1995. The simulation results from "INTERACTING ACCELERATION COMPENSATION ALGORITHM FOR TRACKING MANEUVERING TARGETS" showed that the IAC algorithm saves about 50% computation cost in comparison to IMM but with slight degradation in tracking performance. The algorithm is viewed as a two-stage estimator having two acceleration models: the zero acceleration of the constant velocity model and a constant acceleration model. It combines the concept of the IMM for two motion models into the framework of the two-stage estimator.

In the practical implementation, the real-time performances of the above two algorithms are not satisfactory enough, especially in high-g maneuvering air target tracking. In view of these drawbacks, it is a principle object of the present invention to provide a maneuvering target tracking method via modifying the Interacting Multiple Model (IMM) and the Interacting Acceleration Compensation (IAC) algorithms to achieve a better tracking performance.

SUMMARY OF THE INVENTION

Accordingly, it is an object of the present invention to provide a maneuvering target tracking method via modifying the Interacting Multiple Model (IMM) and the Interacting Acceleration Compensation (IAC) algorithms, wherein adaptive factors are introduced through the detection of the normalized innovation squared which is chi-square probability distributed.

Yet another object of the present invention is to provide a maneuvering target tracking method via modifying Interacting Multiple Model(IMM) and the Interacting Acceleration Compensation(IAC) algorithms, wherein the modified IMM and IAC algorithms scale up the process noise covariance in time and reflecting the high-g maneuver motion of the targets.

A further object of the present invention is to provide a maneuvering target tracking method via modifying the Interacting Multiple Model (IMM) and the Interacting Acceleration Compensation (IAC) algorithms, wherein the simulation results show that the modified algorithms perform better than the original algorithms.

Other object and advantages of the present invention will become more apparent from the following description taken in conjunction with the accompanying drawing.

DETAILED DESCRIPTION OF THE PREFERRED EMBODIMENT

Figure 1:
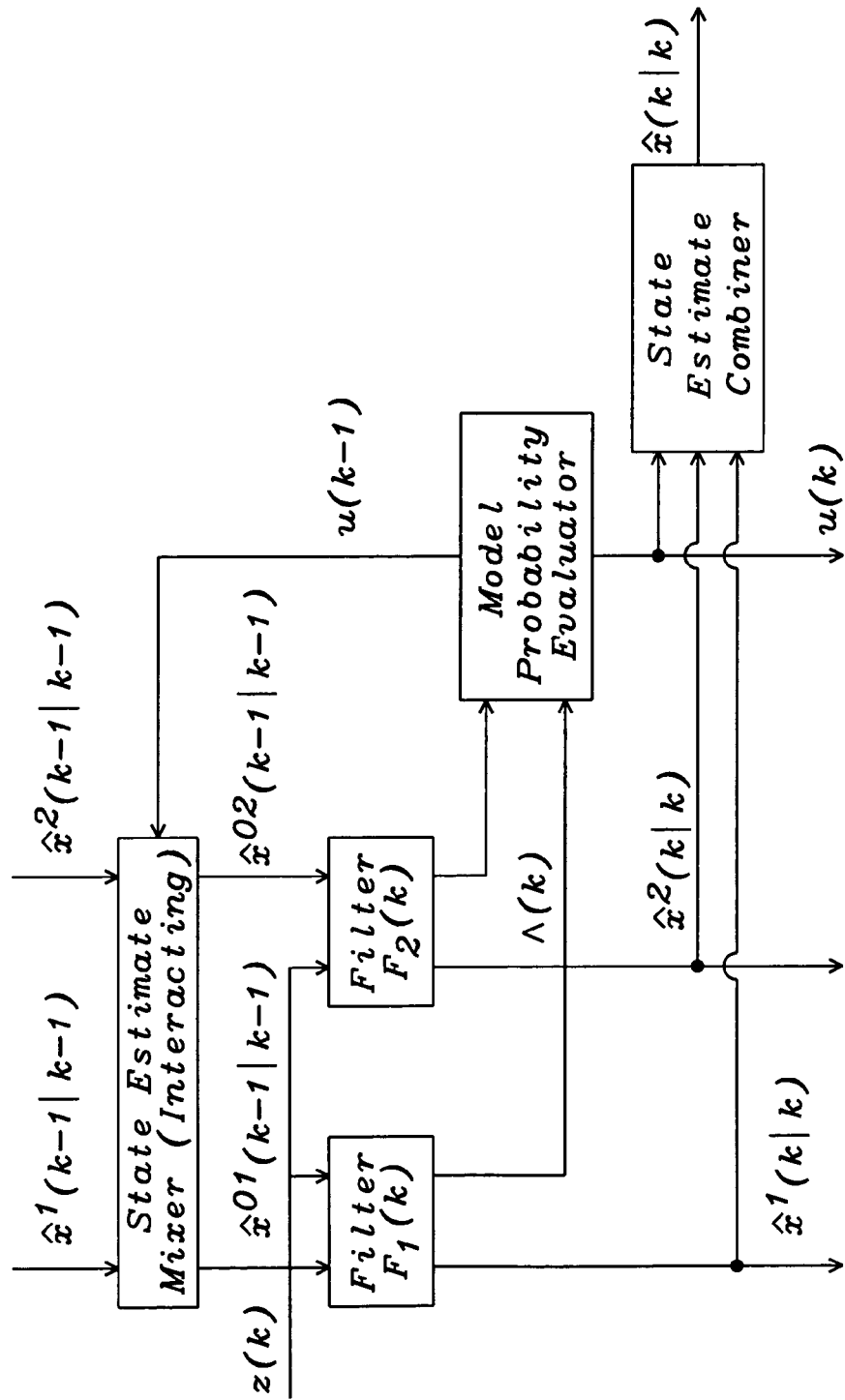
FIG. 1 shows the structure of the two model Interacting Multiple Model tracking algorithm.

In accordance with the present invention, the Interacting Multiple Model algorithm will be described as follows:

Consider a target model with Markovian switching coefficients $$x(k+1)=F(k)\sigma(k+1)x(k)+G(k)\sigma(k+1)v(k) \quad (1)$$

$$z(k)=H(k)\sigma(k)x(k)+w(k) \quad (2)$$

where σ(k) is a finite state Markov chain taking values in {1, ... j} according to the model transiting probability $p_{ij}$ from model i to model j; and v(k) and w(k) are white process and measurement noise, respectively. One cycle of two models (j=2) Interacting Multiple Model algorithm is given by the following structural chart (FIG. 1). FIG. 1 shows the structure of two model IMM algorithm.

In view of the above, the IMM algorithm consists of running a filter $F_1(k)$ and $F_2(k)$ for each model, respectively; a state estimate mixer at the input of the filters; a model probability evaluator and a state estimate combiner at the output of the filters. The multiple models interact through the mixing to track a maneuvering target.

Assuming the target model transiting is governed by an underlying Markov chain, the state estimate mixer uses the model probabilities u(k) and the model transiting probabilities $p_{ij}$ to compute a mixed estimate for filter $F_1(k)$ and $F_2(k)$. Each filter then uses the mixed estimate and the measurement to compute a new estimate and likelihood Λ(k). The likelihood, prior model probabilities u(k−1), and model transiting probabilities $p_{ij}$ are then used to compute the new model probabilities.

An overall state estimate $\hat{x}(k)$ is computed with the new state estimates and their model probabilities. The j models IMM algorithm is concluded in the following 4 steps:

Step 1: State Estimates Mixing

Starting with state estimates $\hat{x}^i(k-1|k-1)$, state error covariances $P^j(k-1|k-1)$, and associated model probabilities $\mu^j(k-1)$. The initial state estimate for model j at time k, $M^j(k)$, is computed as $$\hat{x}^{0j}(k-1|k-1) = \sum_{i=1}^{N}\hat{x}^i(k-1|k-1)u^{i|j}(k-1|k-1) \quad (3)$$

where $$u^{i|j}(k-1|k-1) = \frac{1}{\bar{c}_j}p_{ij}\mu^i(k-1) \quad (4)$$

$$\bar{c}_j = \sum_{i=1}^{N}p_{ij}\mu^i(k-1) \quad (5)$$

The mixed covariance for $M^j(k)$ is computed as $$P^{0j}(k-1|k-1) = \sum_{i=1}^{N}u^{i|j}(k-1|k-1)\{P^i(k-1|k-1)+ \\ [\hat{x}^i(k-1|k-1)-\hat{x}^{0j}(k-1|k-1)] \times \\ [\hat{x}^i(k-1|k-1)-\hat{x}^{0j}(k-1|k-1)]^T\} \quad (6)$$

Step 2: Model-Conditioned Updates

The $M^j(k)$ model-conditioned updates are obtained through Kalman filtering equations $$\hat{x}^j(k|k)=\hat{x}^j(k|k-1)+W^j(k)V^j(k) \quad (7)$$

$$P^j(k|k)=P^j(k|k-1)-W^j(k)S^j(k)W^j(k)^T \quad (8)$$

with $$P^j(k|k-1)=F^j(k)P^{0j}(k-1|k-1)F^j(k)^T+Q^j(k) \quad (9)$$

$$S^j(k)=H^j(k)P^j(k|k-1)H^j(k)^T+R^j(k) \quad (10)$$

$$W^j(k)=P^j(k|k-1)H^j(k)^T S^j(k)^{-1} \quad (11)$$

$$V^j(k)=z(k)-H^j(k)\hat{x}^j(k|k-1) \quad (12)$$

where $V^j(k), S^j(k)$ and $W^j(k)$ are the innovation, innovation covariance and filter gain, respectively.

Step 3: Model Probabilities Update

The model probabilities are updated as $$\mu^j(k) = \frac{1}{c}\Lambda^j(k)\bar{c}_j \text{ with } c = \sum_{i=1}^{N}\Lambda^i(k)\bar{c}_i \quad (13)$$

where $\Lambda^j(k)$ is the likelihood of $M^j(k)$ and is computed as $$\Lambda^j(k) = \frac{1}{\sqrt{|2\pi S^j(k)|}}\exp[-0.5V^j(k)^T S^j(k)^{-1} V^j(k)] \quad (14)$$

Step 4: State Estimates Combination

The output state estimate and error covariance are obtained by $$\hat{x}(k) = \sum_{i=1}^{N}\hat{x}^i(k|k)u^i(k) \quad (15)$$

$$P(k|k) = \sum_{i=1}^{N}u^i(k)\{P^i(k|k)+ \\ [\hat{x}^i(k|k)-x(k|k)] \times [\hat{x}^i(k|k)-x(k|k)]^T\} \quad (16)$$

Interacting Acceleration Compensation (IAC) Algorithm

In the IAC algorithm, the two models IMM algorithm is treated as a two-stage estimator. The two-stage estimator is viewed as having two acceleration models $M^1(k)$ and $M^2(k)$, where $M^1(k)$ is corresponding to the constant velocity model and $M^2(k)$ is to the model of constant acceleration.

The IMM algorithm is then used with the acceleration models to compute the acceleration estimate that compensates the constant velocity filter estimate.

Consider a linear system with Markovian switching coefficients within the acceleration models represented as $$x(k+1) F(k)x(k)+G(k)\sigma(k+1)A(k)+G^c(k)v^c(k) \quad (17)$$

$$A(k+1)=A(k)+G^b(k)\sigma(k+1)v^b(k) \quad (18)$$

$$z(k)=H(k)z(k)+C(k)\sigma(k+1)A(k)+w(k) \quad (19)$$

where x(k) contains the position and velocity and A(k) is the acceleration.

For acceleration model i and according to the two-stage filter, the compensated state estimates are $$\hat{x}^1(k|k)=\hat{x}^c(k|k) \quad (20)$$

$$\hat{x}^2(k|k)=\hat{x}^c(k|k)+\overline{V}(k)A^2(k|k) \quad (21)$$

$$P^1(k|k)=P^c(k|k) \quad (22)$$

$$P^2(k|k)=P^c(k|k)+\overline{V}(k)\Sigma^2(k|k)\overline{V}^T(k) \quad (23)$$

where $\hat{x}^c(k|k)$ and $P^c(k|k)$ are the mean and the error covariance of the constant velocity filter, $A^2(k|k)$ is the acceleration estimate, and $\overline{V}(k)$ is defined in Eq. 35 above. The IAC algorithm is presented in the following 5 steps:

Step 1: Acceleration Estimates Mixing

Considering the constant velocity filter state estimate $\hat{x}^c(k-1|k-1)$, state error covariance $P^c(k-1|k-1)$, and starting with acceleration estimate $A^2(k-1|k-1)$, error covariance $\Sigma^2(k-1|k-1)$, and associated probability $\mu^2(k-1)$, the mixed acceleration estimate and error covariance are given by $$A^{02}(k-1|k-1)=\mu^{2|2}(k-1|k-1)A^2(k-1|k-1) \quad (24)$$

$$\Sigma^{02}(k-1|k-1)=\mu^{2|2}(k-1|k-1)[\Sigma^2(k31\;1|k-1)+\mu^{1|2}(k-1|k-1)\times[[V(k-1)]\times A^2(k-1|k-1)\;[[V(k-1)]]\times A^2(k-1|k-1)^T]A^2(k-1|k-1)\times A^2(k-1|k-1)^T] \quad (25)$$

The mixed state estimate and covariance for the constant velocity filter are $$\hat{x}^{0c}(k-1|k-1)=\hat{x}^c(k-1|k-1) \quad (26)$$

$$P^{0c}(k-1|k-1) = P^c(k-1|k-1) + \quad (27)$$
$$[\sum_{i=1}^{2} \mu^i(k-1)\mu^{1|i}(k-1|k-1)$$
$$\mu^{2|i}(k-1|k-1)] \times$$
$$[\overline{V}(k-1)A^2(k-1|k-1)]$$
$$[\overline{V}(k-1)A^2(k-1|k-1)]^T$$

Step 2: Model-Conditioned Updates

The two-stage filtering equations provide the model-conditioned updates. The bias-free filter is a Kalman filter as Eq. (7–12). The bias filter is given by $$b(k|k-1)=b(k-1|k-1) \quad (28)$$

$$\Sigma(k|k-1)=\Sigma(k-1|k-1)+G^b(k-1)Q^b(k-1)G^b(k-1)^T \quad (29)$$

$$b(k|k)=b(k|k-1)+K^b(k)V^b(k) \quad (30)$$

$$\Sigma(k|k)=[I-K^b(k)\overline{S}(k)]\Sigma(k|k-1) \quad (31)$$

where $$V^b(k)=V(k)-\overline{S}(k)b(k|k-1) \quad (32)$$

$$K^b(k)=\Sigma(k|k-1)S^T(k)[[W^b(k)^{-1}]]S^b(k)^{-1}$$

$$S^b(k)=S(k)+\overline{S}(k)\Sigma(k|k-1)\overline{S}(k)^T \quad (34)$$

$$V(k)=U(k)-W(k)\overline{S}(k)$$

$$\overline{S}(k)=H(k)U(k)+C(k) \quad (36)$$

$$U(k)=F(k-1)\overline{V}(k-1)+G(k-1) \quad (37)$$

Step 3: Model Likelihood Computations

The likelihood of $M^j(k)$ are given by $$\Lambda^1(k) = \frac{1}{\sqrt{|2\pi S(k)|}}\exp[-0.5V(k)^T S(k)^{-1} V(k)] \quad (38)$$

$$\Lambda^2(k) = \frac{1}{\sqrt{|2\pi S^b(k)|}}\exp[-0.5V^2(k)^T S^2(k)^{-1} V^2(k)] \quad (39)$$

where j=2 refers to the acceleration model, $V^2(k),S^2(k)$ are given by Eq. (32–33).

Step 4: Model Probabilities Update

The model probabilities are updated according to Eq. (13–14).

Step 5: State Estimates Combination Similar to Eq. (15–16) the output state estimate and error covariance for the IAC algorithm are given by $$\hat{x}(k|k)=\hat{x}^c(k|k)+\overline{V}(k)A(k|k) \quad (40)$$

$$P(k|k)=P^c(k|k)+\overline{V}(k)\Sigma(k|k)V^T(k)$$

$$A(k|k)=\mu^2(k)A^2(k|k) \quad (42)$$

$$\Sigma(k|k)=\mu^2(k)[\Sigma^2(k|k)+\mu^1(k)A^2(k|k)A^2(k|k)^T] \quad (43)$$

The Modified IMM(MIMM) and IAC(MIAC) Algorithms

In accordance with the present invention, in the above IMM algorithm, for each model, the innovation covariance equation is given by Eq. (10). The $S^j(k)$ is the innovation covariance, $H^j(k)$ is the measurement matrix, $P^j(k|k-1)$ is the state prediction covariance and $R^j(k)$ is the measurement noise covariance.

When the target suddenly maneuvers with high-g acceleration, it manifests itself with a large innovation. To maintain the tracking performance, $S^j(k)$ should be increased to adapt to this maneuvering. However, for each specified model, $H^j(k)$ and $R^j(k)$ are initialised constants, and $P^j(k|k-1)$ has already converged to a relatively small value before the maneuver. One way to increase $S^j(k)$ is to select a large initial value of $R^j(k)$, but this is impractical even though improvement may be obtained in some cases.

To deal with this problem, for each model $M^j(k)$, its process noise covariance $Q^j(k)$ is adjusted and it reflects the maneuvering motion of the target by introducing a scaling factor $\xi^j$ as $$S^j(k)=H^j[F^j(k)P^j(k-1|k-1)F^j(k)^T+\xi^j\times Q^j(k)]H^j(k)^T+R^j(k)$$

where $\xi^j$ is a scaling factor that will scale up $Q^j(k)$ when the target maneuvers and thus increases $S^j(k)$. However, after introducing the $\xi^j$ parameter, some issues need to be answered. These include how to detect a maneuver of the target and when to scale up the parameter $\xi^j$. It is understood that the normalised innovation squared $\psi$ can be formed as follows:

$$\psi=V^j(k)S^j(k)^{-1}V^j(k)^T \quad (45)$$

where $V^j(k)$ is the innovation. As $\psi$ is chi-square distributed, to detect the target maneuver, the value of $\psi$ is compared with a specified threshold. For example, the threshold for 99% confidence interval for 2-D measurement is 9.21 and 11.34 for 3-D measurement. If the threshold is too large, the target maneuver may be detected too late or not even be detected. If it is too small, the maneuver may be falsely detected even though the target moves straight and the noise is haply large. In practice, this initialised threshold will be set a little larger according to the present scenario. Since $\psi$ can be taken as the maneuver detector and once the value of $\psi$ exceeded the specify threshold, the $\xi^J \times Q^J(k)$ term will be kicked in until $\psi$ falls below the threshold. Thus, $\xi^J$ can be taken as an adaptive factor to improve the baseline IMM algorithm and hence form the modified IMM(MIMM) algorithm. The selection of $\xi^J$ is related to the target model selected and $\psi$ reflects the maneuvering capability of targets of interest.

In accordance with the present invention, to modify the IAC algorithm, the scaling factor is not only introduced to the bias-free filter but also to the bias filter. For the bias-free filter, as it is a Kalman filter, the modification is the same as that of MIMM where Eq. (44–45) are used to replace Eq. (10).

For the bias filter, note that in Eq. (29–37), to increase the innovation covariance to match the maneuvering, a scaling factor $\zeta$ is introduced to scale up the process noise covariance $Q^b(k)$ in Eq. (29) as $$\Sigma(k|k-1)=\Sigma(k-1|k-1)+\zeta \times G^b(k-1)Q^b(k-1)G^b(k-1)^T \qquad (46)$$

Also, as the MIMM, Eq. (45) can be used to detect the target maneuver before the substitution of Eq. (29) with Eq. (46).

Target Tracking Performance Comparison

The performance comparison of IMM and MIMM, IAC and MIAC will be described hereinafter. In accordance with the preferred embodiment of the present invention, for simplicity, all the algorithms each contains two models: a constant velocity (CV) model and a constant acceleration (CA) model. In the ensuing discussion, only the CV model probability will be shown since the CA probability is the complement of CV's. The tracking performances of the IMM, MIMM, IAC and MIAC algorithms were checked against the simulated target trajectories with high-g maneuvers in Scenario 1 and 2 mentioned below.

Comparison of IMM and MIMM

Figure 2:
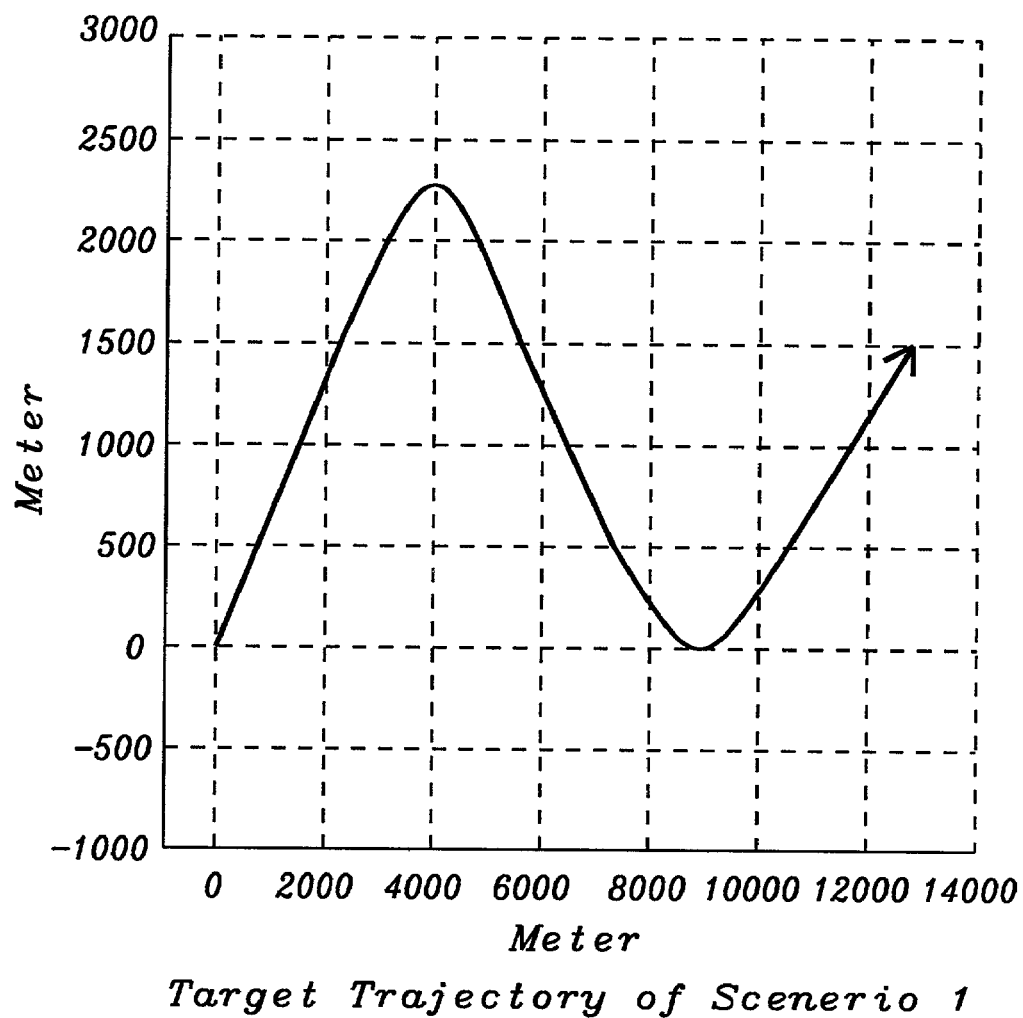
FIG. 2 is a graph schematically showing the target trajectory of scenario 1 of the present invention.

Scenario 1:

In this scenario of the present invention, the target starts at [0 0 1000] in Cartesian coordinates. The initial velocity is [300 200 2.0] and the target keeps a constant speed of 360 m/s. Its trajectory is a straight line between 0 and 10 s. A sudden turn with high-g constant acceleration of 80 m/s² between 10 and 15 s, a straight line between 16 and 25 s, then a turn with constant acceleration of 65 m/s² between 26 to 30 s, and a straight line between 31 to 40 s. The measurements have zero-mean Gaussian errors with standard derivations of 25 m for each coordinate. The target flight path is shown in FIG. 2.

The initial model probability for IMM and MIMM algorithms was $\mu_0$=[0.9 0.1]. The first entry was for the CV model and the second was for the CA model. The model transiting probabilities for both algorithms were [0.95 0.05; 0.1 0.9]. For MIMM, both adaptive factors $\xi^1$ and $\xi^2$ are selected as 100 and $\psi$ is set to 13.5.

Figure 3:
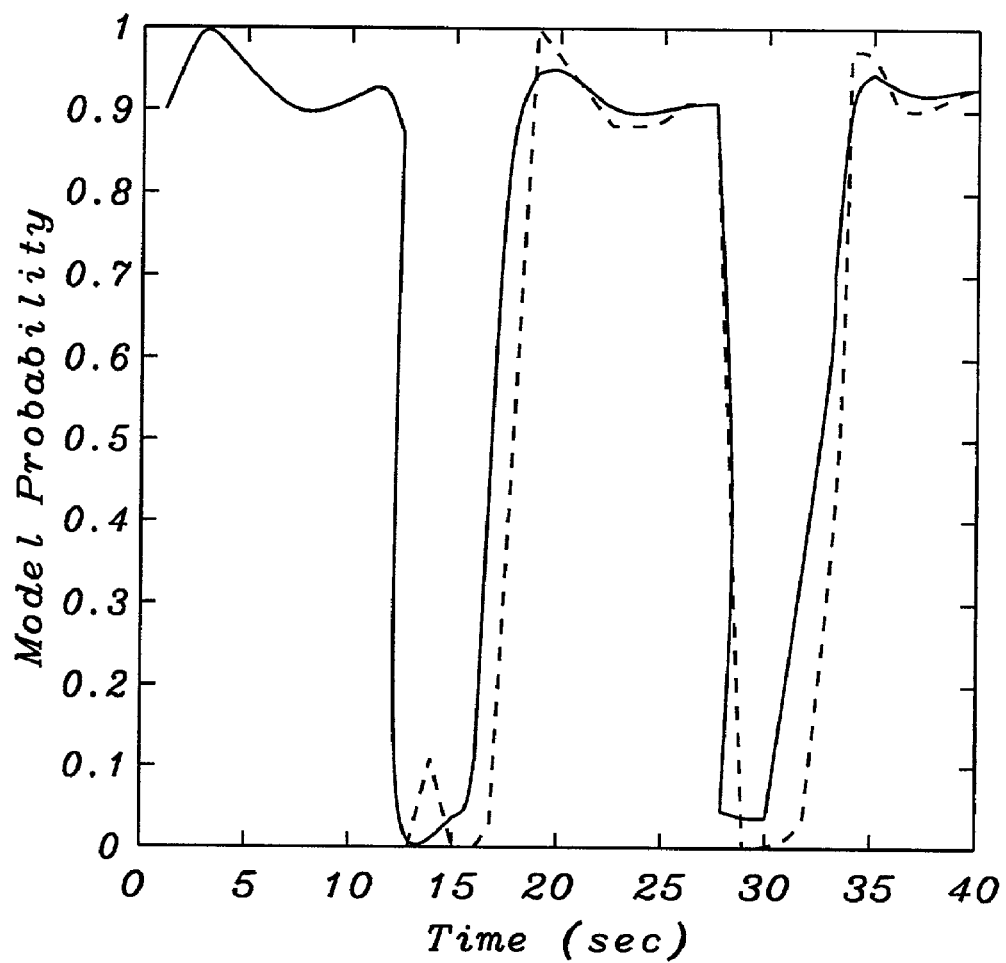
FIG. 3 is a graph schematically showing the model probability of scenario 1 of the present invention.
Figure 4:
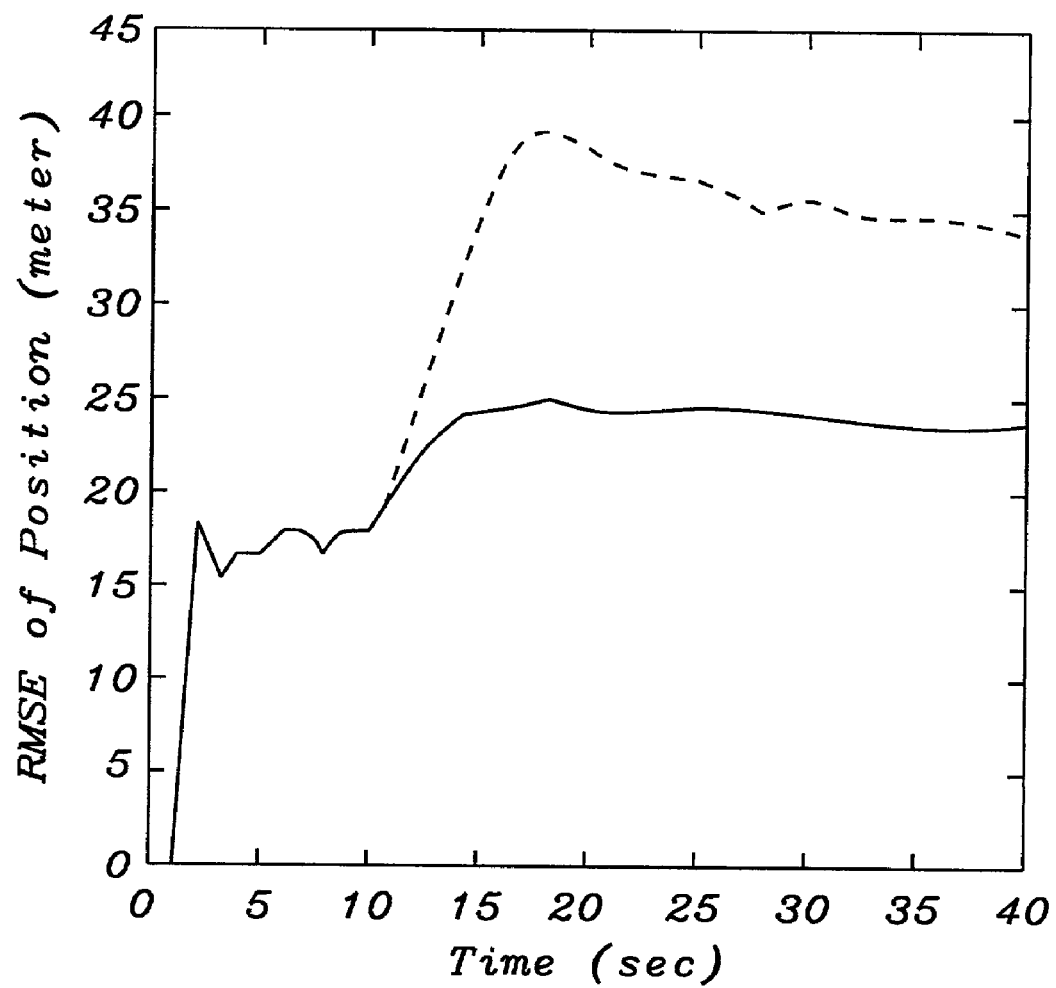
FIG. 4 is a graph schematically showing the position RMSE of scenario 1 of the present invention.

The simulation in the present preferred embodiment takes 100 Monte Carlo runs. The model transiting probability for IMM and AIMM is shown in FIG. 3. It shows that both IMM and AIMM algorithms respond to the thrusting maneuver in a similar manner, however, for the MIMM, the transition from CA to CV is faster than that of IMM at the end of maneuver. The root-mean-square-errors (RMSE) of the position for the IMM and MIMM are shown in FIG. 3. From the figure, it proves that the faster transition from CA to CV of MIMM can handle the sudden maneuver better and is more accurate than the IMM algorithm.

Comparison of IAC and MIAC

Figure 5:
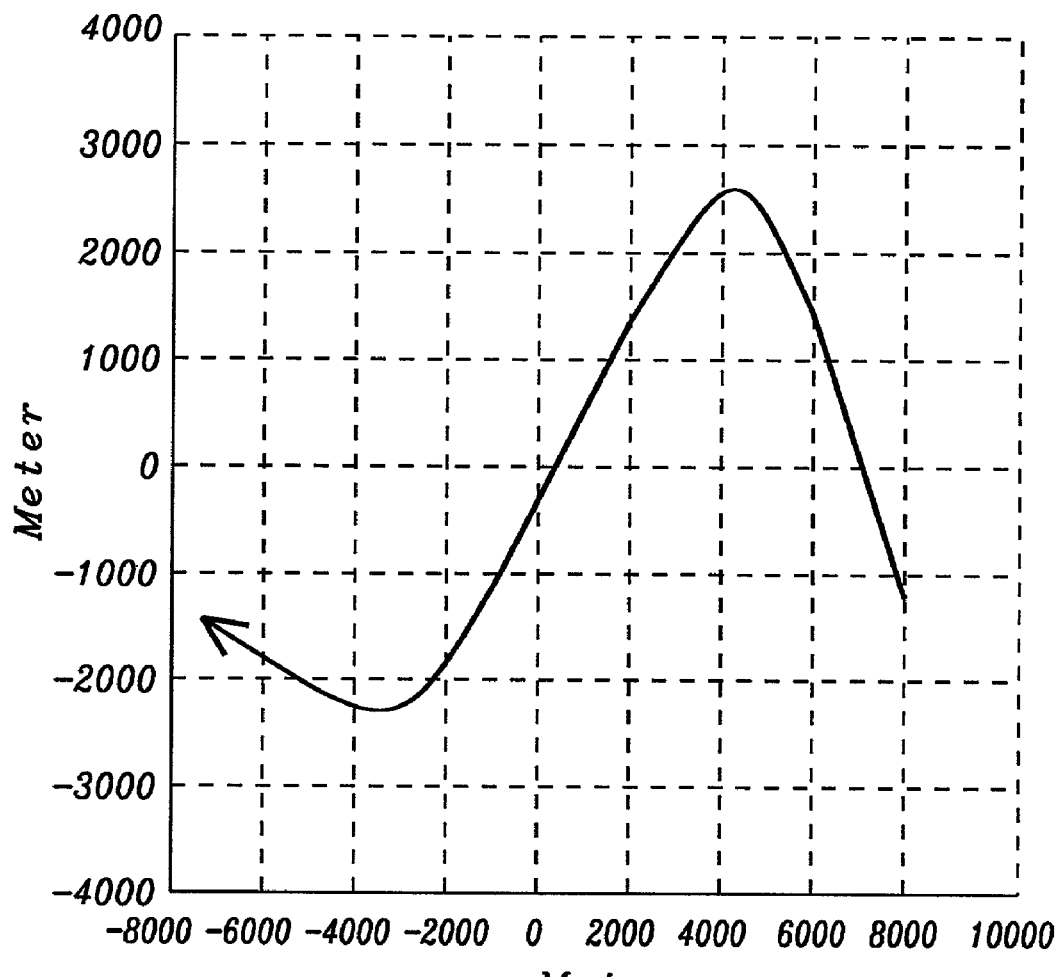
FIG. 5 is a graph schematically showing the target trajectory of scenario 2 of the present invention.

Scenario 2:

In this scenario of the present invention, the target starts at [8000-1200 100] in Cartesian coordinates. The initial velocity is [–224 300 3.0] and the target keeps a constant speed of 375 m/s. Its trajectory is a straight line between 0 and 10 s. A turn with high-g constant acceleration of 75 m/s² between 11 and 18 s, a straight line between 19 and 35 s, a turn with constant acceleration of 65 m/s² between 36 to 40 s, and a straight line between 41 and 50 s. The measurements have zero-mean Gaussian errors with standard derivations of 30 m for each coordinate. The target flight path is shown in FIG. 5.

The initial model probability for the IAC and MIAC algorithms was $\mu_0$=[0.9 0.1]. Also the first entry was for the CV model and the second was for the CA model, respectively. The model transiting probabilities for both algorithms were [0.99 0.01; 0.05 0.95]. For MIAC, the adaptive factors $\xi$ and $\zeta$ are selected as 2 and 10, respectively, and $\psi$ is set to 13.5.

Figure 6:
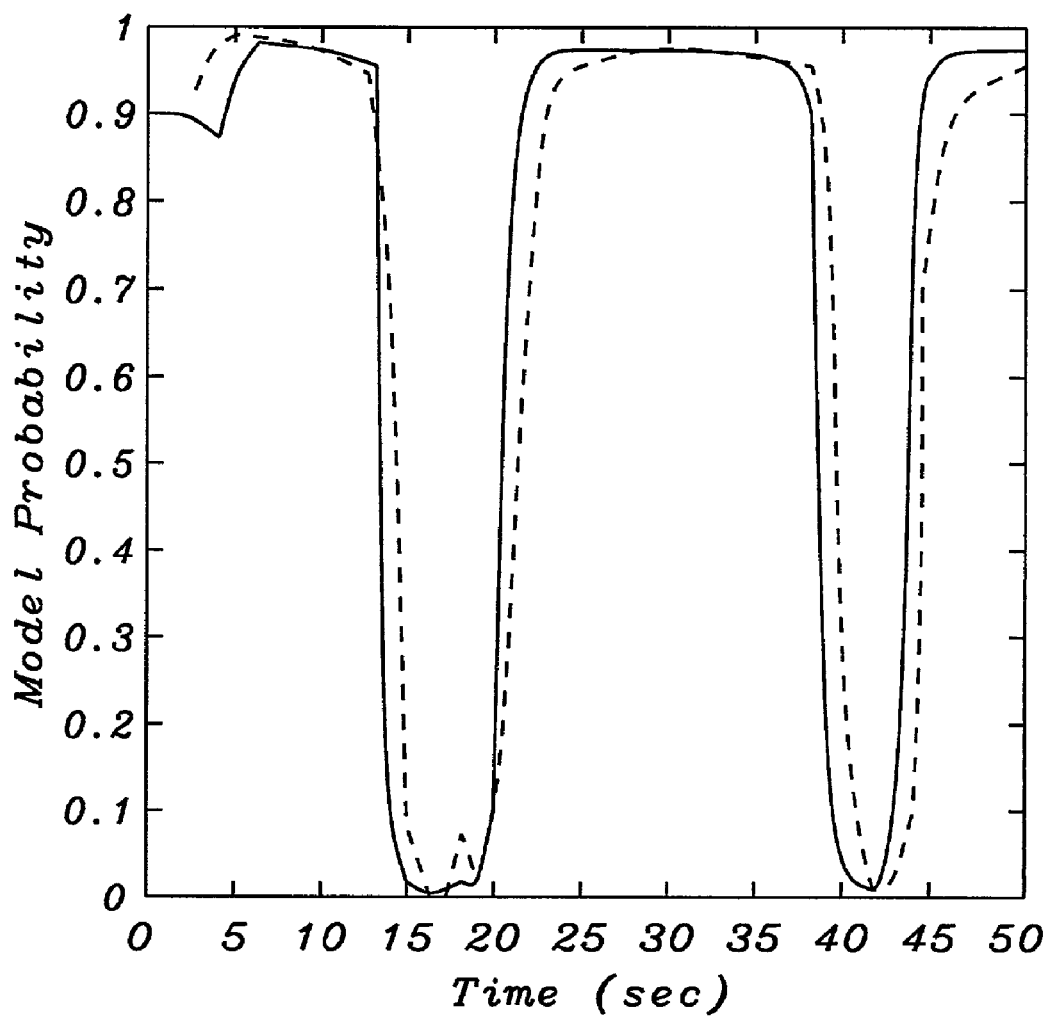
FIG. 6 is a graph schematically showing the model probability of scenario 2 of the present invention.
Figure 7:
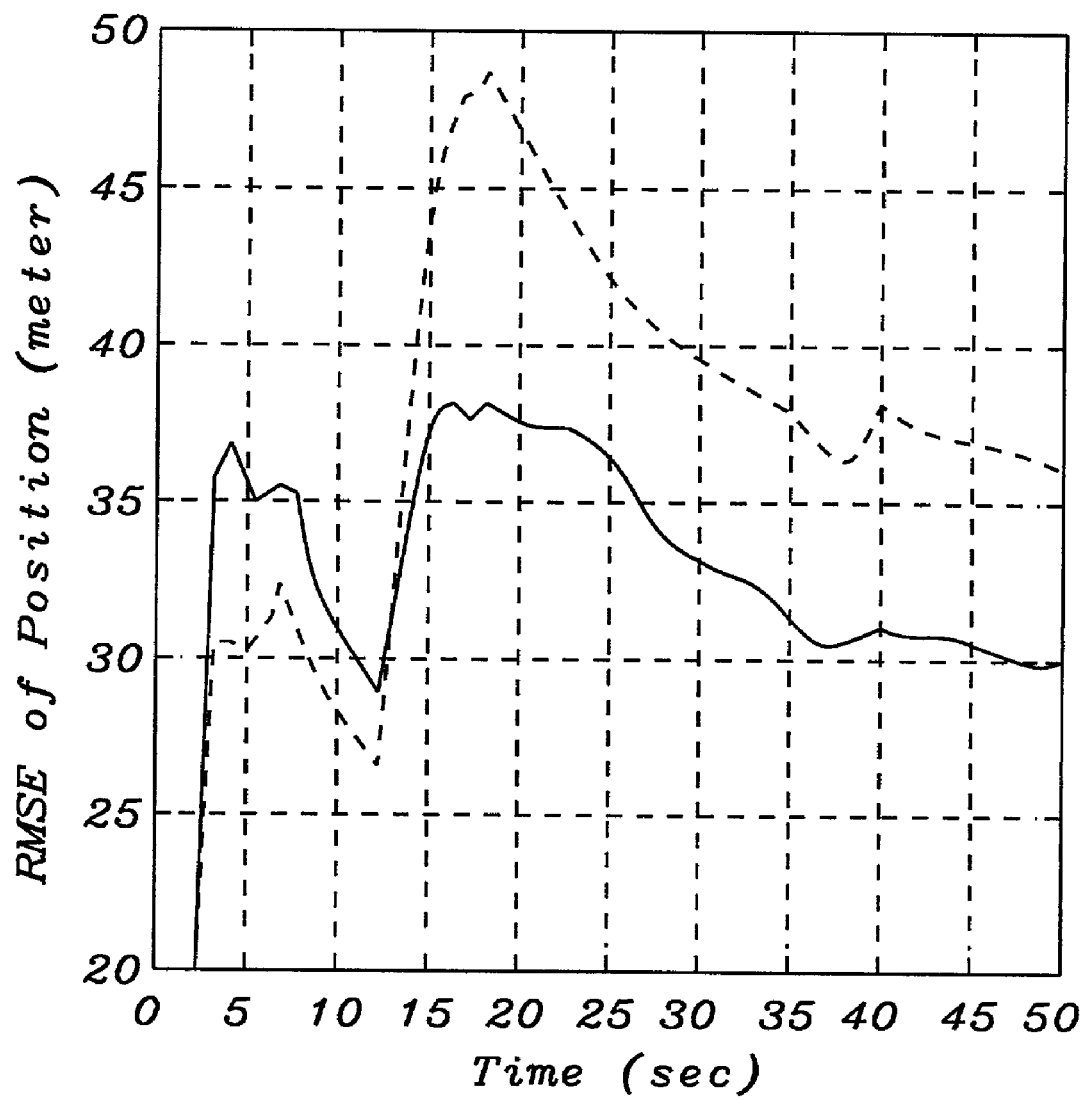
FIG. 7 is a graph schematically showing the position RMSE of scenario 2 of the present invention.

Also 100 Monte Carlo runs are taken. The model probabilities of the CV model for IAC and MIAC algorithms are given in FIG. 6. It is clear that the MIAC is faster in responding to both the start of the turning maneuver and also the end of the maneuver. From FIG. 7, although during the starting part of the flight path (constant speed segment), the RMSE of MIAC is larger than that of IAC, the whole later segments of the flight path shows that MIAC performs much better than IAC.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

The invention claimed is:

1. An estimator for method tracking systems providing improved tracking of maneuvering targets comprising:

using a modified IMM algorithm in which the expressions for each of the $P^J(k|k-1)$, the state prediction covariance for model j, j=1 to n, is modified so that a factor, $f^J$, multiplies the process noise covariance, $Q^J(k)$, for each j, j=1 to n, resulting in that the $P^J(k|k-1)$ are now expressed as $$P^J(k|k-1)=F^J(k)P^J(k-1|k-1) \; F^J(k)^T+f^J Q^J(k);$$

Setting the factors $f^J$=1 for those k such that $V^J(k)S^J(k) V^J(k)^T<C$, where C is an initialized threshold, and $f^J$ being equal to an initially chosen number greater than one for those k such that $V^J(k)S^J(k) \; V^J(k)^T>C$, $V^J(k)$ being the innovation and $S^J(k)$ the innovation covariance for model j, j=1 to n, Whereby an estimator method for tracking as an element of a tracking system, providing improved tracking of maneuvering targets.

2. An estimator method for tracking systems providing improved tracking of maneuvering targets comprising: using a modified IAC algorithm in which the expression for $P(k|k-1)$, the bias-free model state prediction covariance, is modified so that a factor, f, multiplies the bias free process noise covariance, Q(k), resulting in a P(k|k−1) that is now expressed as $$P(k|k-1)=F(k)P(k-1|k-1)F(k)^T+fQ(k),$$

And the expression for P(k|k−1), the bias model innovation covariance, is modified so that a factor, g, multiplies the bias model process noise covariance, $Q^b(k)$, resulting in that P(k|k−1) is now expressed as $$P(k|k-1)=P(k-1|k-1)+gG^b(k-1)Q^b(k-1)G^b(k-1)^T$$

Setting the factor f=1 for those k such that $V(k)S(k)V(k)^T<C$, where C is an initialized threshold, and f being equal to an initially chosen value greater than one for those k such that $V(k)S(k)V(k)^T>C$, V(k) being the innovation and S(k) the innovation covariance for the bias free model, Setting the factor g=1 for those k such that $V^b(k) S^b(k) V^b(k)^T<C$, where C is an initialized threshold, and g being equal to an initially chosen value greater than one for those k such that $V^b(k) S^b(k) V^b(k)^T>C$, $V^b(k)$ being the innovation and $S^b(k)$ the innovation covariance for the bias model, Whereby an estimator method is used as an element of a tracking system providing improved tracking of maneuvering targets.

3. The method of claim 1 wherein n=2.

4. The method of claim 1 wherein n=2, with model 1 being a constant velocity model and model 2 being a constant acceleration model.

5. The method of claim 2 wherein said bias-free model is a constant velocity model.

6. The method of claim 2 wherein said bias model is a constant acceleration model.

* * * * *